July 23, 1968        T. P. WUTKA        3,393,611

COMBINED PRESSURE SENSOR AND LIMITER

Filed Jan. 28, 1966        2 Sheets-Sheet 1

INVENTOR.
THOMAS P. WUTKA
BY Norman Friedland
ATTORNEY

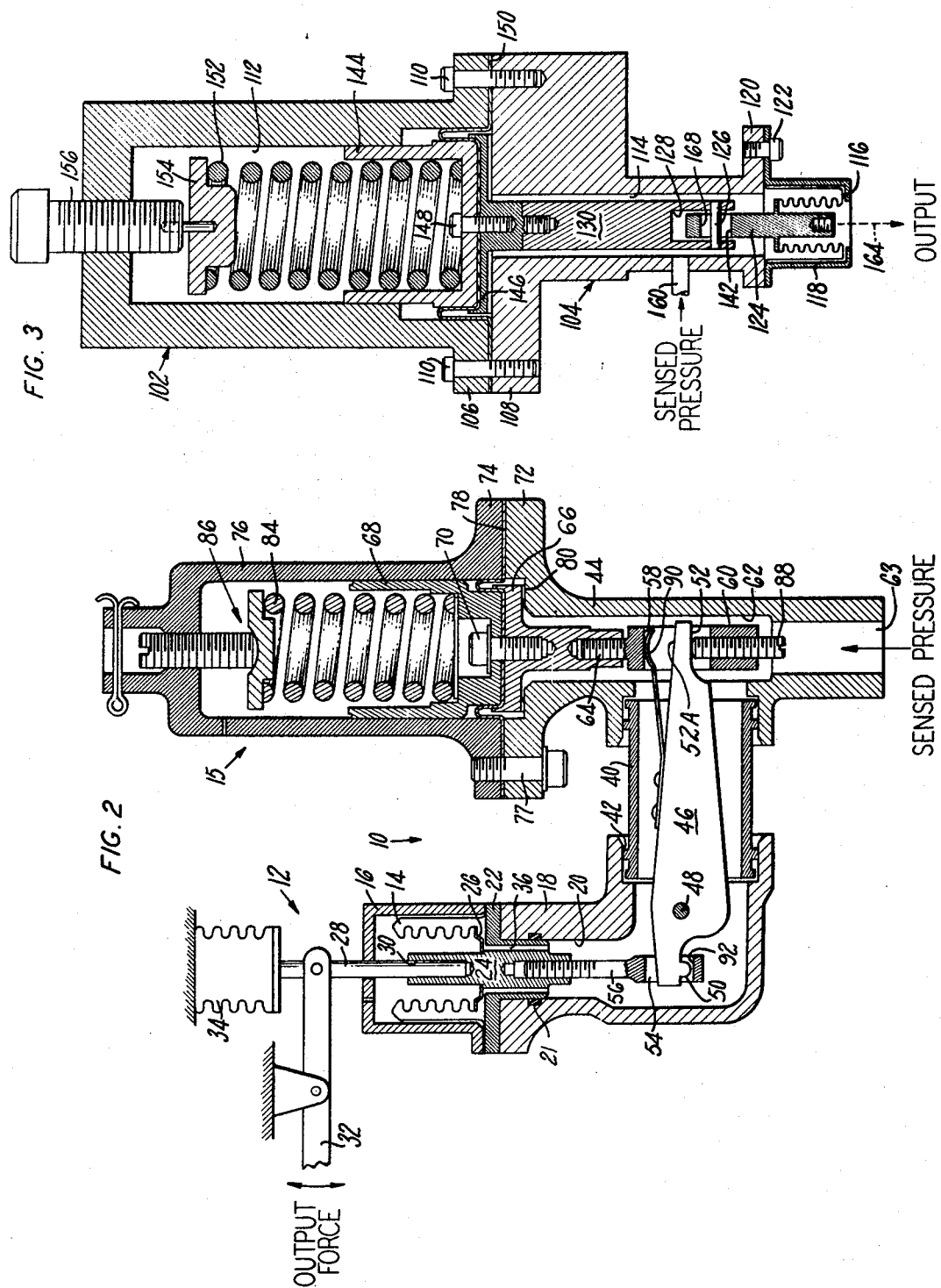

United States Patent Office 3,393,611
Patented July 23, 1968

3,393,611
COMBINED PRESSURE SENSOR AND LIMITER
Thomas P. Wutka, Thompsonville, Conn., assignor to United Aircraft Corporation, East Hartford, Conn., a corporation of Delaware
Filed Jan. 28, 1966, Ser. No. 523,641
5 Claims. (Cl. 92—36)

ABSTRACT OF THE DISCLOSURE

A pressure responsive bellows produces a mechanical output signal which is a direct function of the sensed pressure. A limit imposed on said bellows prevents the mechanical output signal to go beyond a predetermined value. A second pressure responsive device measures the pressure above the predetermined value and through a mechanical interconnection overrides the bellows to produce the mechanical output signal at a different rate than the first signal.

---

This invention relates to pressure sensors and more particularly to a combined sensor and limiter therefor.

This sensor and limiter is of the type that not only limits a sensed pressure signal but also at a predetermined value produces an output signal which is at a different rate than the output signal produced by the sensor.

While this invention will be described as it is employed in a fuel control for a turbine type of powerplant, it is to be understood that its application is not limited thereto.

As is well known in the art, it is customary to sense a pressure of the engine and utilize this as one of the control parameters for regulating fuel flow to the burner of that engine. In many instances compressor discharge pressure is selected.

Also well known in the art is that the fuel control contains a computing section which senses other parameters and computes them into a ratio value indicative of $W_f/P_3$, where $W_f$ is fuel flow in pounds per hour and $P_3$ is compressor discharge pressure. Actual compressor discharge pressure is sensed and applied to a multiplication system which serves to multiply the actual sensed compressor discharge pressure with the computed $W_f/P_3$, ratio to create a signal indicative of scheduled fuel flow. This signal, in turn, is fed to the throttle valve to regulate the fuel to the engine.

Certain engine applications do not require this type limiter since the pressure never exceeds an untolerable limit. The problem exists in those engines where pressure in the engine can build up to a value which is above the structural integrity of the engine working and supporting mechanism. When this occurs, it is necessary to reduce rather than increase fuel flow at a rate different than what was called for by the sensor just below the limit value.

For an understanding of the problem solved by this invention, reference should be made to FIGURE 1 which is a graphical illustration of the output requirement of the sensor and limiter. Thus, referring to the graph in FIGURE 1, the line A shows the output of the pressure sensor, point B indicates the limit, and the line C indicates the reduction in fuel flow as regulated by the pressure limiter. It is apparent that the slope of line A is different than the slope of line C.

While other types of limiters have been employed to fulfill the same requirements, these heretofore known limiters were unsatisfactory because they were not sufficiently accurate to give the proper slope illustrated by line C.

Another problem existed with the heretofore known types of limiters inasmuch as they evidenced high hysteresis. When the compressor discharge pressure level declines after going beyond the limit value, the limiter should increase fuel flow along the same slope illustrated by line C. The heretofore known types of controls would shift and increase fuel flow along a different slope line. I have found that I can obviate this problem so that the hysteresis is substantially eliminated and fuel flow beyond the pressure limit value will increase and decrease along a constant droop or slope line.

Another problem obviated by this invention is the elimination of failures occurring as a result of contamination and ice accumulation. The heretofore types of limiters were designed to bleed engine compressor discharge pressure through orifices. Since the compressor discharge air contained moisture, on cold days it was apt to freeze at the orifices and interfere with the operation thereof. Also, foreign matter in the air could clog the orifice and be another source of trouble. This potential problem required constant and frequent inspection of the limiter when installed in an aircraft.

It is therefore an object of this invention to obviate the problems noted above.

It is still a further object of this invention to provide in a combined sensor and limiter as described mechanical means for producing a schedule for fuel flow at a predetermined rate.

Other features and advantages will be apparent from the specification and claims and from the accompanying drawings which illustrate an embodiment of the invention.

FIGURE 2 is a sectional view illustrating one embodiment of this invention, and

FIGURE 3 is a sectional view illustrating another embodiment of this invention.

Figure 1:
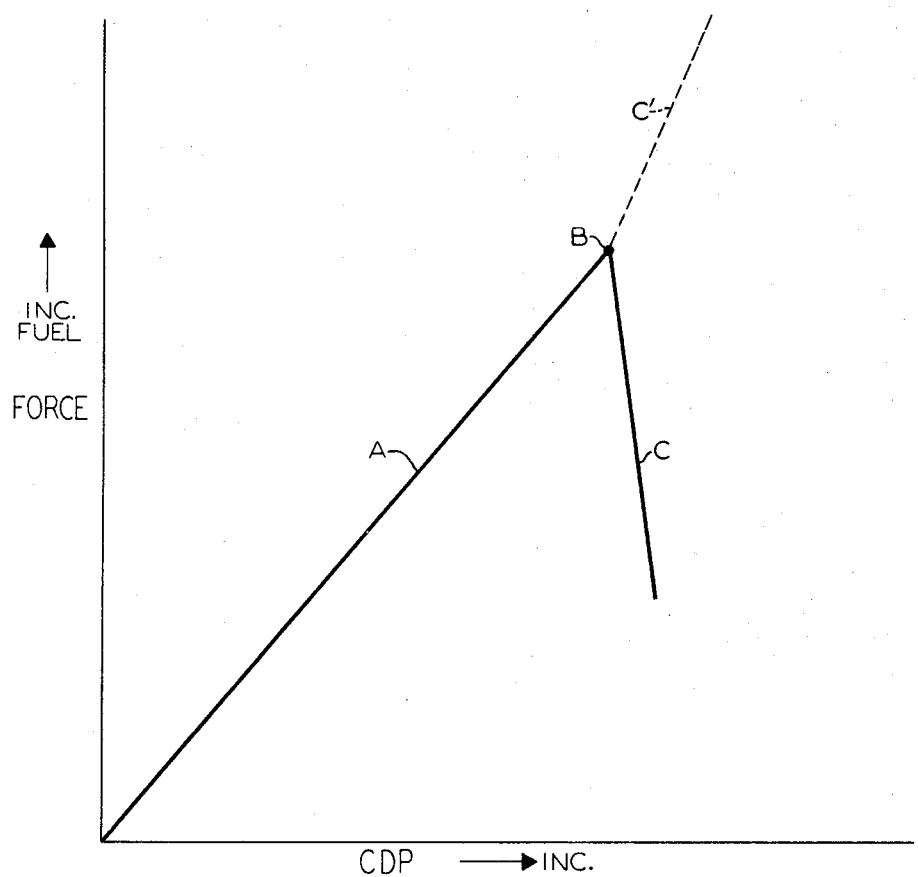
FIGURE 1 is a graphical illustration indicating the output requirements of the combined sensor and limiter.

Referring next to the details of this invention, as shown in FIG. 2, the combined sensor and limiter is generally indicated by numeral 10 comprising a sensing section 12 and a limiting section 15.

The sensing section 12 consists of a motor bellows 14 suitably retained in housing 16. Housing 16 is, in turn, supported to casing 18 having a central bore 20 terminating at the top thereof. Sleeve 22 carries a radial flange interposed between the bottom of casing 16 and the top of casing 18 and snugly fits adjacent bore 20. An O-ring 21 serving to prevent leakage between the wall of bore 20 and the outer surface of sleeve 22 may be provided. Central support member 24 suitably attached to the bottom wall 26 of bellows 14 projects through a central opening therein into the opening of housing 16. Rod 28, in turn, is supported in a recess formed in rod 24 in order to transmit axial force generated by the bellows to pivotally secured lever 32. The other end of rod 28 is suitably secured to the free end of evacuated bellows 34 which serves to reference the sensed signal to an absolute value.

For the sake of understanding this invention, it is only necessary to understand that lever 32 carries the output signal which is indicative of the pressure sensed and may be applied in any manner where a force signal is desired as would be obvious to one skilled in the art.

In a fuel control application this lever would form a portion of the multiplication mechanism wherein the compressor discharge pressure sensed by bellows 14 is applied to another signal producing element for obtaining the product of the two signals.

It will be noted that the outer periphery at the lower end of member 24 is spaced from the inner diameter of sleeve 22 providing annular passage 36 which communicates internally of bellows 14 and bore 20 of casing 18.

As noted from FIGURE 2, the lower end of casing 18 flares radially and has secured thereto an interconnecting casing member 40 which is suitably secured in sealed relationship at the end 42. The other end of casing 40 likewise is secured to the casing member 44 of the limiting section 15. Lever 46 pivoted at pivotal point 48 carries a pair of contacting surfaces 50 and 52 at either end. Contacting surface 50 fits into slot 54 formed in the threaded rod 56 which threaded rod is threadably secured to the bottom end of member 24 to move therewith. The other end of lever 46 fits into slot 58 formed in rod 60 which is centrally mounted in the bore 62 formed in casing 44.

As can be seen from FIG. 2, member 60 carries an upstanding threaded portion 64 which is threadably secured to the bottom of member 66 which is, in turn, threadably secured to piston 68 by stud 70. Radially extending flange 72 of casing 44 engages the complementary flange 74 of casing 76 and secured to each other by a series of bolts 77 (only one of which is shown). Interposed between the surfaces of the flange is a sealing diaphragm 78 which extends across the cavity and is adjacent the piston 68.

Thus, from the foregoing it is apparent that the central bores of casings 44 and 76 are in axial alignment and divided in a pair of chambers by piston 68 and its cooperating sealing diaphragm 78. It is also noted that members 66 and 60 are spaced from the wall of bore 62. Sensed pressure in this instance, compressor discharge pressure of the engine, is admitted into these bores through opening 63 formed on the bottom of casing 44. This fluid pressure flows through the casing bores to act on the underside of diaphragm 78 via the space provided between the wall of bore 62 and the members 60 and 66. The diameter of bore 62 of casing 44 at its upper end increases and forms shoulder 80 to accommodate the bottom surface of the radially extended portion of member 66. No sealing occurs at this point and the pressure is allowed to flow to the underside of diaphragm 78.

Also, fluid flows to the motor bellows 14 through the bore formed in casing 40, bore 20 and the annular passage 36.

From the foregoing it is apparent that the sensed pressure acts on both bellows 14 and piston 68. A spring 84 in housing 76 acts on the other end of piston 68 the height of which is adjustable by the adjusting assembly 86. The force of the spring determines the limit. Referring to FIG. 1, this point corresponds to point B. The contacting surface 52 is held against the adjusting screw 88 by virtue of leaf spring 90 which is secured to the lever 46 in any suitable manner.

It can be seen from FIG. 2 that the surface 50 is spaced away from the engaging surface 92 of member 56. Thus, any motion below the limit established by spring 84 and the area of the pressure acting surfaces will not interfere with the small transient movement of rod 28.

Now that the details of this invention have been described, the next portion will describe the operation thereof. When the pressure sensed by bellows 14 is below the value corresponding to point B of FIG. 1, surface 92 of member 56 will be disengaged from contact face 50 of fulcrum lever 46 and the output signal corresponding to line A will result. That is, as pressure increases, the force on lever 32 will increase correspondingly.

When the sensed pressure increases to a value corresponding to point B, the force acting on piston 68 will create a force overcoming the force exerted by spring 84. Piston 68 will then move upwardly causing fulcrumed lever 46 to rotate counterclockwise about pivot point 48 and place contacting face 50 in engagement with surface 92.

A further increase of pressure then will cause piston 68 to be urged further and then exert a force on member 56 which, in turn, is transmitted to lever 32 via member 24 and rod 28 to create a signal corresponding to line C. The output signal which was generated by the pressure times the sensing area of bellows 14 without the limiter in play, will now be equivalent to the pressure times the area of piston 68 times the lever ratio of fulcrumed lever 46 minus the pressure times the sensing area of bellows 14. This force, then, tends to move member 56 downwardly and this force is transmitted to lever 32 via member 24 and rod 28.

Thus when assembled as shown in FIG. 2, the output force will be decreased as the pressure increases above the limit pressure point B on FIG. 1. However, by reversing the limiting section 15 so that the limiting screw 88 contacts the lever 46 on the opposite side of the lever at 52A instead of at 52, the output signal could be made to increase at a faster rate above point B on FIG. 1 as shown as dash line C′ in FIG. 1.

The embodiment illustrated in FIGURE 3 is substantially similar to the embodiment illustrated in FIGURE 2 except that the lever interconnecting the limiter and the sensing motor bellows is eliminated. Referring now to the details of FIGURE 3, the sensor and limiter are contained in housings 102 and 104 each of which carry complementary flanges 106 and 108 which are suitably secured as illustrated by the studs 110. Centrally disposed bore 112 in casing 102 is in axial alignment with bore 114 in casing 104. Sensing bellows 116 is mounted on the end of casing 104 and is encapsulated by cap 118 secured to flange 120 of casing 104 by suitable securing stud 122. Bellows 116 carries arm 124 suitably fastened to the free end thereof and extends into bore 114. Pin 126 suitably fastened to the bifurcated section 128 of rod 130 fits through a slot 142 formed in member 124. The other end of member 130 is fastened to the bottom of piston 144 by connecting element 146 which is threadably secured to the top end of 130 and held to the bottom of piston 144 by stud 148. A sealing diaphragm 150 is mounted between flanges 106 and 108 and extends adjacent the bottom face of piston 144 across the bore 112. Adjustable spring 152 acts on one end of piston 144 and is adjusted by the adjusting mechanism consisting of retainer 154 and the screw adjustment 156. The force created by spring 152, similar to the limiter shown in FIG. 2, serves to establish point B illustrated in FIGURE 1. Pressure is admitted internally through opening 160 and flows to act on bellows 116 through the annular space defined between the wall of bore 114 and the outer periphery of member 130 and is also directed to the underside of piston 144 to act against the force of spring 152, The output of the sensed pressure generated by the motor bellows 116 is illustrated by the dash line 164 and corresponds to the lever 28 shown in FIG. 2.

Hence, below the pressure level established by the spring 152 or point B of FIGURE 1, the motor bellows 116 will produce an output equivalent to line A and at this regime of operation pin 126 is out of engagement with the edges of slot 142. When the pressure builds up to a value corresponding to point B owing to the force generated by piston 144, pin 126 will engage face 168 of slot 142. A further increase in pressure will cause piston 144 to be urged upwardly forcing member 124 in the same direction reducing the output force at a rate corresponding to line C, similarly to what was described in connection with FIG. 2.

In this manner the limiter of FIGURES 2 or 3 not only prevents the pressure from building up to a point established by the force of springs 84 or 152 respectively, corresponding to point B of FIG. 1 but if the pressure for any reason should increase beyond this point the limiter will produce an output signal at a much faster rate in a decreasing direction.

It should be understood that the invention is not limited to the particular embodiments shown and described herein, but that various changes and modifications may be made without departing from the spirit or scope of this novel concept as defined by the following claims.

I claim:
1. A combined sensor and limiter comprising in combination, a first pressure sensor adapted to sense a pressure intended to be measured and produce an output signal at a rate which is a function of the pressure sensed, a second pressure sensor also adapted to sense said pressure intended to be sensed, force means acting on said second pressure sensor rendering said second pressure sensor inoperative, said force means yielding above a predetermined value of the pressure sensed and means interconnecting said first and second pressure sensors solely when said force means yields above said predetermined value to override said first pressure sensor to produce an output signal at a different rate which is at a function of the sensed pressure.

2. A combined sensor and limiter as claimed in claim 1 wherein said second pressure sensor includes a piston having one face exposed to said pressure intended to be sensed and said force means includes a spring acting on the opposite side of said piston.

3. A sensor and limiter including a housing defining a cavity and an inlet admitting pressure into said cavity, pressure responsive means having a pressure reacting surface exposed in said cavity, a mechanical connection attached to the pressure responsive means for receiving a force generated by said pressure responsive means as a function of the pressure in said cavity, in combination with another pressure responsive means also having a pressure reacting surface exposed in said cavity, yieldable means opposing the force of the pressure in said cavity acting on said pressure reacting surface of said other pressure responsive means and rendering it inoperative below a preselected value, means interconnecting said pressure responsive means and said other pressure responsive means solely above the value at which said yieldable means yields whereby the force received by said mechanical connection is at a different value for a given change in pressure in said cavity.

4. A sensor and limiter as claimed in claim 3 wherein said pressure responsive means is a bellows and the other pressure responsive means is a piston and the reacting surface of said piston is larger than the reaction surface of said bellows.

5. A sensor and limiter as claimed in claim 3 wherein said connection means includes a fulcrumed lever having one end continuously engageable with said other pressure responsive means and said other end only engageable with said pressure responsive means when said yieldable means yields above a predetermined value.

References Cited
UNITED STATES PATENTS

| | | | |
|---|---|---|---|
| 3,068,648 | 12/1962 | Fleming et al. | 60—39.28 |
| 2,400,442 | 5/1946 | Stevens | 92—76 X |
| 2,477,897 | 8/1949 | Ray | 92—50 X |
| 2,610,564 | 9/1952 | Cooper et al. | 92—64 X |
| 2,637,334 | 5/1953 | Starkey | 92—37 X |
| 2,753,882 | 7/1956 | Bottoms | 92—76 X |
| 2,808,819 | 10/1957 | Hagele et al. | 123—140.2 |
| 2,965,137 | 12/1960 | Leeson et al. | 92—36 X |
| 2,989,000 | 6/1961 | Alcard. | |
| 3,106,104 | 10/1963 | Harry. | |

MARTIN P. SCHWADRON, *Primary Examiner.*

I. C. COHEN, *Assistant Examiner.*